UNITED STATES PATENT OFFICE 2,680,731

ACETALS CONTAINING A CYANOACETYL GROUP

Elmore Louis Martin, Wilmington, Del., assignor to E. I. du Pont de Nemours and Company, Wilmington, Del., a corporation of Delaware No Drawing. Application July 5, 1950, Serial No. 172,192

11 Claims. (Cl. 260—66)

This invention relates to a new class of acetals of polyhydric alcohols with aromatic aldehydes. More particularly, it relates to new color-forming acetals of aromatic aldehydes having specific usefulness in color photography.

Polyhydric alcohol acetals of various amido derivatives of m-aminobenzaldehyde have been proposed heretofore for use in color photography. For example, outstanding magenta color-formers comprising a polyhydric alcohol acetal of a m - (5 - acyloxypyrazole) amidobenzaldehyde are described in U. S. Patent 2,476,988. It has now been found that magenta color-formers of very high quality and effectiveness can be obtained from certain other amido derivatives of m-aminobenzaldehyde.

The new products of this invention are the polyhydric alcohol acetals of cyanoacetyl acylamido benzaldehydes, and the photographic silver halide emulsions containing these acetals. More specifically, the chemical compounds of this invention are acetals, with monomeric or polymeric polyhydric alcohols, of aldehydes of the formula:

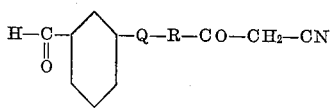

wherein R is a divalent radical, aromatic in character, whose terminal atoms are carbon, and Q is the carbonamido, —NH—CO—, radical, or the sulfonamido, —NH—SO$_2$—, radical.

In the compounds defined above the alcohol portion of the molecule, i. e., the portion acetalized with the cyanoacetylacylamido benzaldehyde, is preferably either a monomeric 1,2- or 1,3-alkanediol of 2 to 4 carbon atoms, or a hydroxyl polymer which is water-soluble to hydrophilic in character and contains a large number of recurring intralinear

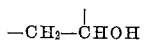

groups, e. g., polyvinyl alcohol itself, or a partly hydrolyzed vinyl ester, or a hydrolyzed interpolymer of vinyl esters with minor proportions of other vinyl compounds. The acetals of monomeric polyhydric alcohols may be used as such in photographic emulsions containing gelatin, or they may be used as intermediates in the preparation of the acetals of polymeric vinyl alcohols, etc., the latter being used in photographic emulsions as both the color-former and the water-permeable binding agent for the silver halide grains.

The radical R in the above formula may be any divalent cyclic radical having aromatic properties. Thus, it can be an aryl or substituted aryl radical or a heterocyclic radical which is aromatic in character, the latter forming a well-recognized chemical class (see, for example, Whitmore's "Organic Chemistry," pages 874-875, published by D. Van Nostrand and Company, New York, N. Y., 1937).

The acetals of this invention may be prepared in various ways. One method, illustrated in Examples I–III below, comprises the following steps: (1) reacting a cyanoacetyl aryl carboxylic acid with thionyl chloride to give a cyanoacetyl aryl carboxylic acid chloride (I); (2) reacting (I) with a monomeric polyhydric alcohol acetal of m-aminobenzaldehyde to give the corresponding acetal of a cyanoacetyl aryl carbonamido benzaldehyde (IIa); (3) reacting (IIa) with a polyvinyl alcohol under acetal-forming conditions to give the polyvinyl acetal of a cyanoacetyl aryl carbonamido benzaldehyde (IIIa). The above steps are shown schematically by the following equations, using 4-cyanoacetylbenzoyl chloride and the ethylene glycol acetal of m-aminobenzaldehyde as illustrative reactants:

1.

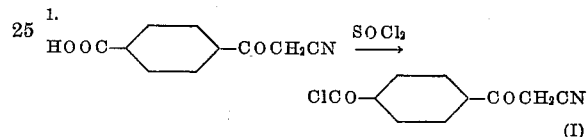

2.

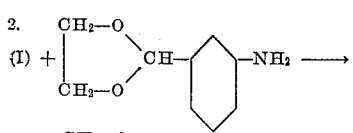

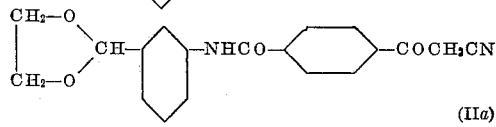

3.

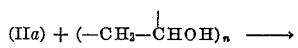

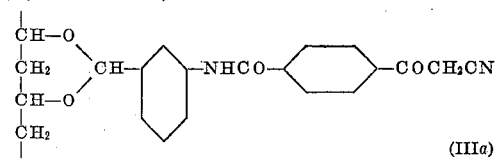

Another method, illustrated in Examples VI to IX below, comprises the following steps: (1) reacting a carbalkoxy aryl carboxylic acid chloride with a monomeric polyhydric alcohol acetal of m-aminobenzaldehyde to give the corresponding acetal of a carbalkoxy aryl carbonamido benzaldehyde (IVa); (2) reactive (IVa) with acetonitrile in the presence of an alkaline condensing agent to give the acetal of a cyanoacetyl aryl carbonamido benzaldehyde (IIa); and (3) reacting (IIa) with a polyvinyl alcohol to give the polyvinyl acetal of a cyanoacetyl aryl carbonamido benzaldehype (IIIa). These steps are shown in the following equations using p-carbethoxybenzoyl chloride and the ethylene glycol acetal of m-aminobenzaldehyde as illustrative reactants:

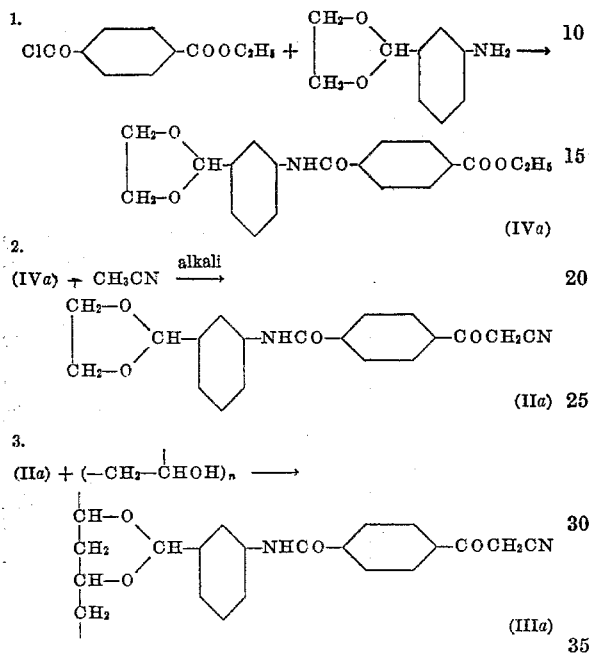

A third method, illustrated in Examples IV and (V), is specifically useful for the preparation of the sulfonamido derivatives. It comprises the following steps: (1) reacting an alkyl ester of an aromatic monobasic carboxylic acid with chlorosulfonic acid to give a carbalkoxy aryl sulfonyl chloride (V); (2) reacting V with a monomeric polyhydric alcohol acetal of m-aminobenzaldehyde to give the corresponding acetal of a carbalkoxy aryl sulfonamido benzaldehyde (IVb); (3) reacting (IVb) with acetonitrile in the presence of an alkaline condensing agent to give the acetal of a cyanoacetyl aryl sulfonamido benzaldehyde (IIb); and (4) reacting (IIb) with a polyvinyl alcohol to give the polyvinyl acetal of a cyanoacetyl aryl sulfonamido benzaldehyde (IIIb). These steps are represented by the following equations, using methyl beta-naphthoate and the ethylene glycol acetal of m-aminobenzaldehyde as illustrative reactants:

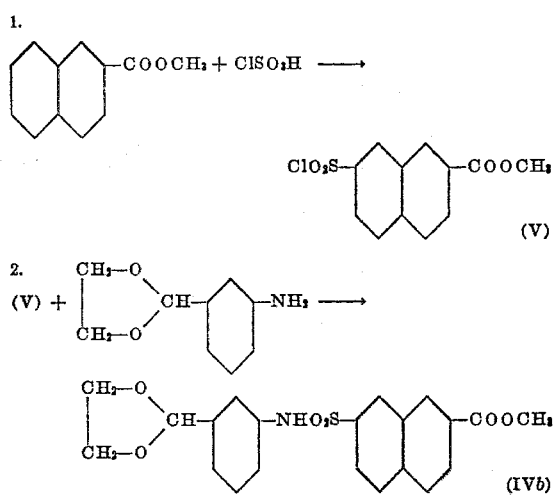

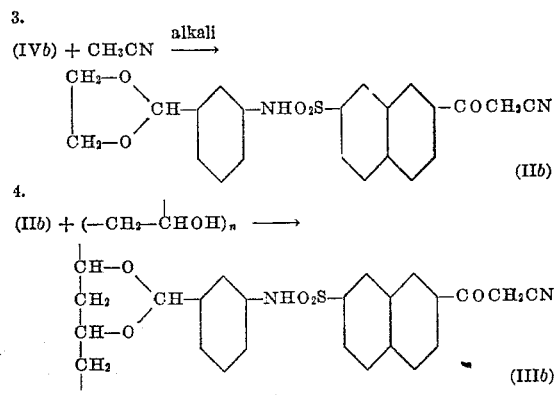

Products IIa and IIIa (the carbonamides) and products IIb and IIIb (the sulfonamides) are the final products of this invention, i. e., the polyhydric alcohol acetals of cyanoacetyl acylamido benzaldehydes, which are used in photographic silver halide emulsions. Products I, IVa, IVb, and V are also new classes of chemicals, not previously described.

The invention is illustrated in greater detail in the following examples, in which parts are by weight unless otherwise noted.

EXAMPLE I

A. *Methyl 4-cyanoacetyl benzoate*

A mechanically stirred mixture of 194 parts of dimethyl terephthalate, 50 parts of acetonitrile, 60 parts of sodium methylate, and 120 parts of chlorobenzene was heated on a stem bath under reflux condenser for 16 hours. The thick reaction mixture was diluted with 200 parts of methanol and poured into 3000 parts of warm water. The chlorobenzene layer was separated, the aqueous solution was filtered and the filtrate was cooled to 0° C., whereupon the sodium salt of methyl 4-cyanoacetyl benzoate crystallized. The salt was collected, pressed as dry as possible, dissolved in warm water and the methyl 4-cyanoacetyl benzoate was precipitated by passage of carbon dioxide into the stirred solution. The cyanoacetyl ester was collected, washed with water and crystallized from a mixture of acetone and water. There was obtained 130 parts of colorless crystals melting at 170–172° C. Analysis:

Calcd. for $C_{11}H_9O_3N$ _____ C, 64.99; H, 4.47
Found _____ C, 64.89; H, 4.78

B. *4-cyanoacetylbenzoic acid*

A solution of 28 parts of methyl 4-cyanoacetyl benzoate in 100 parts of a 10% aqueous solution of sodium hydroxide was warmed to 80° C. for 20 minutes. The solution was acidified with hydrochloric acid, and the precipitated cyanoacetylbenzoic acid was collected, washed with water and crystallized from ethanol. There was obtained 16 parts of colorless crystals, M. P. 230–232° C. with decomposition.

C. *4-cyanoacetylbenzoyl chloride*

A suspension of 18.9 parts of 4-cyanoacetylbenzoic acid in 100 parts of dioxane and 35 parts of thionyl chloride was heated at gentle reflux with stirring until a homogeneous solution was obtained. The mixture was filtered and the excess thionyl chloride and a part of the dioxane were removed by distillation under reduced pressure. The pure acid chloride tends to decompose on standing and it is advisable to use the dioxane solution of the acid chloride soon after preparation,

D. m-(p - Cyanoacetylbenzamido) benzaldehyde ethylene glycol acetal

To a mechanically stirred mixture of 16.5 parts of m-aminobenzaldehyde ethylene glycol acetal, 50 parts of acetone, and 10 parts of a solution of 14 parts of potassium carbonate in 50 parts of water was added dropwise the dioxane solution of the above acid chloride, the temperature being maintained at 0–5° C. by means of external cooling and the pH of the reaction mixture being kept at 7–9 by the portionwise addition of the remainder of the potassium carbonate solution. The amido acetal separated during the addition of the acid chloride solution and after stirring for an additional thirty minutes, the reaction mixture was diluted with 500 parts of water, the amido acetal collected, washed with water and dried. Crystallization from acetone-benzene gave 22.5 parts of colorless crystals, M. P. 157–158° C. This compound has the formula:

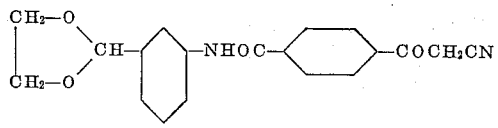

Analysis:
  Calcd. for $C_{19}H_{16}O_4N_2$__ C, 67.84; H, 4.80; N, 8.34.
  Found _____ C, 67.81, 68.13; H, 4.73, 4.96; N, 8.32, 8.49.

E. m-(p - Cyanoacetylbenzamido) benzaldehyde polyvinyl acetal

A mixture of 10 parts of polyvinyl alcohol, 2 parts of m-(p-cyanoacetylbenzamido) benzaldehyde ethylene glycol acetal, 0.5 part of o-sulfobenzaldehyde sodium salt, 70 parts of ethylene glycol and 0.9 part of 92% phosphoric acid was stirred at 72° C. for 40 minutes. The reaction mixture was cooled, diluted with 100 parts of methanol, the color-forming polyvinyl acetal was collected, washed with methanol, and twice slurried with 200 parts of methanol and filtered. After air drying there was obtained 11.5 parts of colorless polyvinyl acetal which was readily soluble in aqueous ethanol.

F. Photographic emulsion using m - (p - cyanoacetylbenzamido) benzaldehyde polyvinyl acetal A mixture of 10 parts of m-(p-cyanoacetylbenzamido) benzaldehyde polyvinyl acetal, 40 parts of ethanol, 150 parts of water, and 0.6 part of a 10% solution of sodium carbonate was stirred at 70–75° C. for 15 minutes. The resulting homogeneous solution was cooled to room temperature and used to prepare a silver halide emulsion under such conditions as to prevent exposure or fogging of the sensitive silver salts as follows.

To 90 parts of the above solution was added 20 parts of ethanol and to the resulting solution was added simultaneously and at essentially equivalent rates a solution of 31 parts of 3 N ammonium bromide and 2 parts of 0.5 N potassium iodide in 32 parts of water together with a solution of 29 parts of 3 N silver nitrate in 25 parts of 20% ammonium hydroxide and 7 parts of water during the course of 10 minutes. After stirring for a total of one-half hour, the emulsion was run into 250 parts of a 15% aqueous sodium sulfate solution. The precipitated silver halide-color-former emulsion was pressed into a thin sheet, cut into small pieces and washed for one hour in running water, after which the excess water was drained off. A mixture of 25 parts of ethanol and 25 parts of water was added and the mixture was stirred at 70–75° C. for 10 minutes. The remainder of the original solution was added and the stirring continued for an additional 10 minutes. After cooling to 25° C., the emulsion was coated on film base, the resulting photographic film was exposed and then developed in a solution prepared as follows:

|   | Grams |
|---|---|
| p-Aminodiethylaniline hydrochloride | 2.5 |
| Sodium sulfite (anhydrous) | 2.0 |
| Sodium carbonate (monohydrate) | 20.0 |
| Potassium bromide | 2.0 |
| Water to make 1000.0 cc. | |

The film was then fixed in 25% sodium thiosulfate, washed, bleached in 4% potassium ferricyanide, washed, fixed in 25% sodium thiosulfate and washed. The resulting film gave a bright, strong magenta negative dye image.

EXAMPLE II

A. Methyl 2-cyanoacetylthiophene-5-carboxylate

A mixture of 50 parts of dimethyl thiophene-2,5-dicarboxylate (see Griffing and Salisbury, J. Am. Chem. Soc. 70, 3416 (1948) for preparation), 15 parts of acetonitrile, 16 parts of sodium methylate and 100 parts of dioxane was stirred on a steam bath for 16 hours. The thick reaction mixture was diluted with 50 parts of methanol and poured into 750 parts of water. The resulting solution was filtered and the cyanoacetyl ester was precipitated by the passage of carbon dioxide into the stirred filtrate. The crude reaction product was collected, washed with water and crystallized from aqueous methanol. Recrystallization from methylene chloride-petroleum ether gave 32 parts of colorless crystals melting at 143–145° C. The compound is soluble in aqueous solutions of alkali and alkali metal carbonates, insoluble in alkali metal bicarbonate solutions.

B. 2-cyanoacetylthiophene-5-carboxylic acid

A solution of 40 parts of methyl 2-cyanoacetylthiophene-5-carboxylate in 300 parts of 10% aqueous potassium hydroxide solution was maintained at 60° C. for 10 minutes and then acidified with hydrochloric acid. The carboxylic acid was collected, washed with water, and the still moist filter cake was crystallized from ethanol. There were obtained 25 parts of colorless crystals melting at 204–207° C. with decomposition.

C. 2-cyanoacetylthiophene-5-carboxylic acid chloride

A mixture of 9.7 parts of 2-cyanoacetylthiophene-5-carboxylic acid, 10 parts of thionyl chloride and 100 parts of dioxane was heated at 95° C. for 10 minutes. The excess thionyl chloride and a part of the dioxane were removed by distillation under reduced pressure and the acid chloride used directly for the amidation of m-aminobenzaldehyde as described in section D.

D. m-(5-cyanoacetyl-2-thiophenecarboxamido)-benzaldehyde ethylene glycol acetal The dioxane solution of the above acid chloride was added dropwise to a mechanically stirred mixture of 9.9 parts of m-aminobenzaldehyde ethylene glycol acetal and 20 parts of acetone, the temperature being maintained at 0° C. by means of external cooling and the pH of the reaction mixture being maintained at 7–9 by the portion-wise addition of a solution of 7 parts of potassium carbonate in 50 parts of water. After stirring for one-half hour at 0° C., the reaction product was collected, washed with cold water and dried. Crystallization from acetone-benzene gave fine, faintly yellow crystals melting at 208–210° C. This compound has the formula:

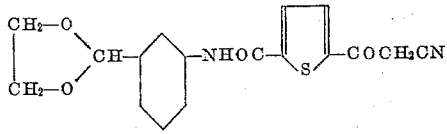

E. *m-(5-cyanoacetyl-2-thiophenecarboxamido)-benzaldehyde polyvinyl acetal*

A mixture of 10 parts of polyvinyl alcohol, 2 parts of m-(5-cyanoacetyl-2-thiophenecarboxamido)benzaldehyde ethylene glycol acetal, 65 parts of ethylene glycol, 20 parts of dioxane and 1 part of 92% phosphoric acid was stirred at 80° C. for 80 minutes. The color-forming polyvinyl acetal was isolated essentially as described in Example I, section E.

F. *Photographic emulsion using m-(5-cyanoacetyl - 2 - thiophenecarboxamido)benzaldehyde polyvinyl acetal*

Two hundred (200) parts of a 5% solution of the polyvinyl acetal was prepared essentially as described in Example I, section F. A silver halide emulsion was prepared, coagulated, washed, redispersed and coated on film base essentially as described in Example I, section F. The processed film gave a strong magenta, negative dye image.

EXAMPLE III

A. *Methyl 3-cyanoacetyl benzoate*

A mixture of 97 parts of dimethyl isophthalate, 30 parts of sodium methylate, 150 parts of acetonitrile and 70 parts of dioxane was stirred on a steam bath for 16 hours. Cold water was added to the reaction mixture, the solution filtered and the cyanoacetyl ester precipitated by passing carbon dioxide into the stirred filtrate. The crude cyanoacetyl ester was collected, washed with cold water, dried and crystallized from methylene chloride-petroleum ether. The yield of colorless crystals melting at 95–98° C. was 45 parts.

B. *3-cyanoacetylbenzoic acid*

A solution of 41 parts of methyl 3-cyanoacetylbenzoate in 250 parts of 10% aqueous sodium hydroxide solution was stirred at 75–80° C. for 5 minutes, then acidified with hydrochloric acid and the carboxylic acid was collected. Crystallization from ethanol gave 34 parts of 3-cyanoacetylbenzoic acid, M. P. 174–176° C.

C. *3-cyanoacetylbenzoyl chloride*

A solution of 34 parts of 3-cyanoacetylbenzoic acid, 150 parts of dioxane and 36 parts of thionyl chloride was refluxed gently for 5 minutes, then the excess thionyl chloride and a part of the dioxane were removed under reduced pressure. The dioxane solution of the acid chloride was used without isolating the pure acid chloride for the amidation of m-aminobenzaldehyde ethylene glycol acetal.

D. *m-(3-cyanoacetylbenzamido) benzaldehyde*

The dioxane solution of the above acid chloride was added dropwise to a mixture of 33 parts of m-aminobenzaldehyde ethylene glycol acetal, 70 parts of acetone and 25 parts of ice, the temperature being maintained at 0° C. by means of external cooling and the pH of the reaction mixture being maintained at 7–9 by the portionwise addition of a solution of 28 parts of potassium carbonate in 50 parts of water. After stirring for one-half hour, the reaction mixture was diluted with 1000 parts of water, whereupon a thick, sticky material separated. The aqueous solution was decanted, the reaction product taken up in methylene chloride, and the solution was dried. Concentration of the solution gave an oil. Five (5) parts of the oil was dissolved in 40 parts of acetone and 50 parts of 3N hydrochloric acid was added slowly at 40° C. The free aldehyde separated presently, was collected, washed with cold water and crystallized from acetone. The colorless crystals melted at 177–179° C. This compound has the formula:

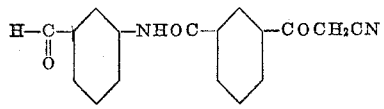

E. *m-(3-cyanoacetylbenzamido) benzaldehyde polyvinyl acetal*

A mixture of 5.5 parts of polyvinyl alcohol, 1 part of m-(3-cyanoacetylbenzamido)benzaldehyde, 0.3 part of o-sulfobenzaldehyde sodium salt, 40 parts of ethylene glycol and 0.5 part of 92% phosphoric acid was stirred at 68–69° C. for 35 minutes. The color-forming polyvinyl acetal was isolated essentially as described in Example I, section E.

F. *Photographic emulsion using m-(3-cyanoacetylbenzamido) benzaldehyde polyvinyl acetal*

A 5% solution of the polyvinyl acetal was prepared essentially as described in Example I, section F. A silver halide emulsion was prepared, coagulated, washed, redispersed and coated on film base essentially as described in Example I, section F. The processed film gave a strong, magenta negative dye image.

EXAMPLE IV

A. *2-carbomethoxy-naphthalenesulfonyl chloride*

To 175 parts of chlorosulfonic acid was added at room temperature 56 parts of methyl beta-naphthoate. After standing for 16 hours, the reaction mixture was poured onto excess ice, the sulfonyl chloride collected, taken up in methylene chloride, and the solution was dried with anhydrous magnesium sulfate. The solution was concentrated somewhat and petroleum ether was added until crystals of the sulfonyl chloride began to separate. After cooling thoroughly, there was obtained 22 parts of a 2-carbomethoxynaphthalene sulfonyl chloride, M. P. 114–117° C. The position of the sulfonyl chloride group was not established.

B. *m-(2- carbomethoxy - naphthalenesulfonamido)benzaldehyde ethylene glycol acetal*

To a mechanically stirred mixture of 13 parts of m-aminobenzaldehyde ethylene glycol acetal, 20 parts of water, and 20 parts of acetone was added slowly a solution of 22 parts of the 2-carbomethoxy-naphthalenesulfonyl chloride in 50 parts of dioxane, the temperature being kept at 5° C. by means of external cooling and the pH at 7–9 by the portionwise addition of a solution of 11 parts of potassium carbonate in 20 parts of water. After stirring at 5° C. for one hour, the reaction mixture was stirred at room temperature for one hour and then diluted with 500 parts of water. The crystalline reaction product was collected, washed with water and crystallized from methylene chloride-petroleum ether. There was obtained 26 parts of colorless crystals, M. P. 164–166° C.

C. *m-(2- cyanoacetyl-naphthalenesulfonamido)- benzaldehyde ethylene glycol acetal*

A mixture of 26 parts of the m-(2-carbomethoxynaphthalenesulfonamido)benzaldehyde ethylene glycol acetal, 10 parts of sodium methylate and 50 parts of acetonitrile was stirred on a steam bath for 4 hours. The reaction mixture was diluted with water and the reaction product precipitated by means of acetic acid. The sticky reaction mass was washed with water and then stirred with a small amount of methylene chloride, whereupon a crystalline material was obtained. Crystallization from a large volume of methylene chloride gave colorless crystals, M. P. 200–202° C. This compound has the formula:

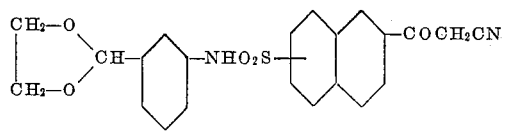

the point of attachment of the sulfonamido group to the naphthalene ring being undetermined.

Analysis:
Calcd. for $C_{22}H_{18}O_5N_2S$ ____ N, 6.64; S, 7.58
Found _____ N, 6.62, 6.74; S, 7.40, 7.40

D. *m-(2-cyanoacetyl-naphthalenesulfonamido)- benzaldehyde polyvinyl acetal*

A mixture of 8 parts of polyvinyl alcohol, 1.6 parts of m-(2-cyanoacetyl-naphthalenesulfonamido) ethylene glycol acetal, 0.5 part of o-sulfobenzaldehyde sodium salt, 60 parts of ethylene glycol and 0.9 part of 92% phosphoric acid was stirred at 70–71° C. for 90 minutes. The color-forming polyvinyl acetal was isolated essentially as described in Example I, section E.

E. *Photographic emulsion using m-(2-cyanoacetylnaphthalenesulfonamido) benzaldehyde polyvinyl acetal*

A 5% solution of the m-(2-cyanoacetylnaphthalenesulfonamido)benzaldehyde polyvinyl acetal was prepared essentially as described in Example I, section F. A silver halide emulsion was prepared, coagulated, washed, redispersed, coated on film base and the exposed photographic film processed essentially as described in Example I, section F. A beautiful magenta negative image was obtained.

EXAMPLE V

A. *2-carbomethoxy-5-benzofuransulfonyl chloride*

To 47 parts of chlorosulfonic acid there was added in small portions 17.6 parts of methyl benzofuran-2-carboxylate, the temperature being maintained at 20–25° C. during the addition of the ester. After stirring for one hour at 25° C., the reaction mixture was warmed to 40° C. and then poured onto excess ice. The sulfonyl chloride was collected, washed with cold water, taken up in methylene chloride, the solution dried and concentrated to a small volume, whereupon petroleum ether was added until crystals appeared. After cooling thoroughly, the crystals were collected and dried under reduced pressure over phosphoric anhydride. There was obtained 10.5 parts of colorless, stout prisms, M. P. 104–105° C.

Analysis:
Calcd. for $C_{10}H_7O_5SCl$ _____ Cl, 12.91; S, 11.68
Found _____ Cl, 13.14, 13.16; S, 11.59, 11.60

B. *m - (2 - carbomethoxy - 5-benzofuransulfonamido)-benzaldehyde ethylene glycol acetal*

To a mechanically stirred mixture of 25 parts of m-aminobenzaldehyde ethylene glycol acetal, 50 parts of dioxane and 25 parts of water there was added dropwise a solution of 40 parts of 2 - carbomethoxy-5-benzofuransulfonyl chloride in 100 parts of dioxane, the temperature being kept at 5° C. by means of external cooling and the pH maintained at 7–9 by the portionwise addition of a solution of 21 parts of potassium carbonate in 50 parts of water. The mixture was stirred at 5–10° C. for 2 hours, then diluted with 500 parts of water. The sulfonamido acetal was collected, washed with water and air dried. Crystallization from acetone-benzene gave 40 parts of colorless crystals.

Analysis:
Calcd. for $C_{19}H_{17}O_7NS$ ___ C, 56.55; H, 4.25; S, 7.95
Found _____ C, 56.60; H, 4.25; S, 7.81, 7.87

C. *m-(2-cyanoacetyl-5-benzofuransulfonamido)- benzaldehyde ethylene glycol acetal*

A mixture of 40 parts of m-(2-carbomethoxy-5 - benzofuransulfonamido)benzaldehyde ethylene glycol acetal, 15 parts of sodium methylate, 100 parts of acetonitrile and 50 parts of dioxane was stirred on a steam bath for 2 hours. The reaction mixture was diluted with 300 parts of water, the solution was filtered, and the reaction product was precipitated with acetic acid. The oily reaction product was separated, washed with water and then stirred with a small amount of methanol whereupon the mixture crystallized. The product was purified by crystallization from acetone-benzene; M. P. 158–161° C.

This compound has the formula:

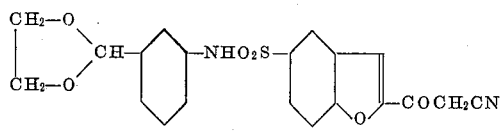

D. *m-(2-cyanoacetyl-5-benzofuransulfonamido)- benzaldehyde polyvinyl acetal*

A mixture of 10 parts of polyvinyl alcohol, 2 parts of m-(2-cyanoacetyl-5-benzofuransulfonamido)benzaldehyde ethylene glycol acetal, 0.6 part of o-sulfobenzaldehyde sodium salt, 70 parts of ethylene glycol and 0.9 part of 92% phosphoric acid was stirred at 67° C. for 35 minutes. The color-forming polyvinyl acetal was isolated essentially as described in Example I, section E.

E. *Photographic emulsion using m-(2-cyanoacetyl - 5 - benzofuransulfonamido)benzaldehyde polyvinyl acetal*

A 5% solution of m-(2-cyanoacetyl-5-benzofuransulfonamido)benzaldehyde polyvinyl acetal was prepared essentially as described in Example I, section F. A silver halide emulsion was prepared, coagulated, washed, redispersed, coated on film base and a piece of the exposed photographic film was processed as outlined in Example I, section F. A strong magenta negative image dye was obtained.

EXAMPLE VI

A. *m-(p-carbethoxybenzamido)benzaldehyde ethylene glycol acetal*

To a mixture of 16.5 parts of m-aminobenzaldehyde ethylene glycol acetal and 40 parts of acetone was added dropwise a solution of 22 parts of p-carbethoxy-benzoyl chloride in 25 parts of dioxane, the temperature being kept at 0° C. by means of external cooling and the pH at 7–9 by the portionwise addition of a solution of 14 parts of potassium carbonate in 50 parts of water. After stirring for one hour at 5° C., the mixture was diluted with 500 parts of water, the acetal ester collected, washed with water and crystallized from methanol-water. The yield of colorless plates melting at 117–119° C. was 22 parts.

B. *m-(p-Cyanoacetylbenzamido) benzaldehyde ethylene glycol acetal*

A mixture of 22 parts of m-(p-carbethoxybenzamido)benzaldehyde ethylene glycol acetal, 11 parts of acetonitrile, 5 parts of sodium methylate and 10 parts of chlorobenzene was stirred on a steam bath for 7 hours. The reaction mixture was diluted with 200 parts of water, the mixture extracted with methylene chloride and carbon dioxide was passed into the aqueous layer until the solution was saturated. The precipitated cyanoacetyl acetal was collected, washed with water, dried and crystallized from acetone-benzene. The colorless crystals, alone or in admixture with the cyanoacetyl acetal of Example I, section D, melted at 157–158° C.

EXAMPLE VII

A. *5-carbomethoxy-2-thiophenecarboxylic acid*

To a solution of 50 parts in dimethyl 2,5-thiophenedicarboxylate in a mixture of 400 parts of methanol and 300 parts of dioxane at 60° C. there was added a solution of 10 parts of sodium hydroxide in 50 parts of water. The mixture was stirred for 15 minutes, during which time the sodium salt of 5-carbomethoxy-2-thiophenecarboxylic acid separated. The salt was collected, washed with methanol, dissolved in 500 parts of water and the solution acidified with hydrochloric acid. The precipitated acid ester was collected, washed and crystallized from methanol-water. The yield of colorless crystals melting at 187–190° C. was 32 parts.

B. *5-carbomethoxy-2-thiophenecarboxylic acid chloride*

A mixture of 32 parts of 5-carbomethoxy-2-thiophenecarboxylic acid and 100 parts of thionyl chloride was refluxed until the evolution of gases had ceased and a homogeneous solution was obtained. The excess thionyl chloride was removed under reduced pressure, whereupon the acid chloride was obtained as a solid mass.

C. *m - (5 - carbomethoxy - 2 - thiophenecarboxamido) - benzaldehyde ethylene glycol acetal*

To a mechanically stirred mixture of 33 parts of m-aminobenzaldehyde ethylene glycol acetal, 70 parts of acetone and 25 parts of ice there was added dropwise a solution of 35 parts of 5-carbomethoxy-2-thiophene carboxylic acid chloride in 50 parts of dioxane, the temperature being kept at 0° C. by means of external cooling and the pH of the reaction mixture being maintained at 7–9 by the portionwise addition of a solution of 28 parts of potassium carbonate in 75 parts of water. After stirring for one hour at 0–10° C., the mixture was diluted with 300 parts of water, the reaction product collected, washed with water and dried. After crystallization from methylene chloride-petroleum ether, there was obtained 54 parts of colorless crystals.

D. *m - (5 - cyanoacetyl - 2 - thiophenecarboxamido) - benzaldehyde ethylene glycol acetal*

A mixture of 54 parts of m-(5-carbomethoxy-2-thiophenecarboxamido)benzaldehyde ethylene glycol acetal, 17 parts of sodium methylate and 100 parts of acetonitrile was stirred on a steam bath for 3 hours. The reaction mixture was diluted with 1000 parts of water and the cyanoacetyl acetal was precipitated by passage of carbon dioxide into the solution. The precipitated color-former was collected, washed with water and air dried. Crystallization from acetone gave 17 parts of crystals melting at 208–210° C. This compound was identical with the material described in Example II, section D.

EXAMPLE VIII

A. *Ethyl 1 - (p - carboxyphenyl) - 5 - methylpyrazole - 3 - carboxylate*

To a stirred solution of 48 parts of ethyl acetopyruvate (see Organic Syntheses, Col. vol I, p. 239) in 200 parts of glacial acetic acid was added, in small portions, 45 parts of p-carboxyphenylhydrazine, the temperature being maintained at 10–15° C. by means of external cooling. The thick reaction mixture was stirred at room temperature for two hours, then heated to reflux and refluxed for 15 minutes. After cooling slightly, the reaction mixture was diluted with 1000 parts of cold water and the ethyl 1-(p-carboxyphenyl)-5-methylpyrazole-3-carboxylate was collected, washed with water and crystallized from alcohol. The yield of colorless crystals melting at 157–159° C. was 77 parts.

Analysis:
Calcd. for $C_{14}H_{14}O_4N_2$------ C, 61.29; H, 5.15; N, 10.22
Found ------------------ C, 61.49; H, 5.55; N, 10.21

B. *Ethyl 1 - (p - chloroformylphenyl) - 5 - methylpyrazole - 3 - carboxylate*

To a suspension of 74 parts of ethyl 1-(p-carboxyphenyl)-5-methylpyrazole-3-carboxylate in 150 parts of benzene there was added 60 parts of thionyl chloride and the resulting mixture was refluxed until a homogeneous solution was obtained and the evolution of hydrogen chloride and sulfur dioxide was complete. The benzene and excess thionyl chloride were removed under reduced pressure on a steam bath and the solid ethyl 1 - (p - chloroformylphenyl) - 5 - methylpyrazole - 3 - carboxylate was dissolved in 150 parts of dioxane and used for the amidation of m-aminobenzaldehyde ethylene glycol acetal without further purification.

C. *m - [p - (3 - carbethoxy - 5 - methyl - 1 - pyrazolyl) benzamido] - benzaldehyde ethylene glycol acetal*

To a mechanically stirred mixture of 41 parts of m-aminobenzaldehyde ethylene glycol acetal, 50 parts of water and 150 parts of acetone there was added slowly the above dioxane solution of ethyl 1 - ( p - chloroformylphenyl) - 5 - methylpyrazole - 3 - carboxylate, the temperature being kept at 0–5° C. by means of external cooling and the pH at 7–9 by the portionwise addition of a solution of 35 parts of potassium carbonate in 50 parts of water. After stirring for 0.5 hour, the reaction mixture was diluted with 1000 parts of water and the m - [p - (3 - carbethoxy - 5 - methyl - 1 - pyrazolyl)benzamido]benzaldehyde ethylene glycol acetal was collected, washed with water and crystallized from a mixture of methylene chloride-ether. The yield of colorless crystals melting at 160–161° C. was 36 parts.

D. m - [p - (3 - cyanoacetyl - 5 - methyl - 1 - pyrazolyl) benzamido] - benzaldehyde ethylene glycol acetal A mixture of 42 parts of m - [p - (3 - carbethoxy - 5 - methyl - 1 - pyrazolyl) benzamido]-benzaldehyde ethylene glycol acetal, 12 parts of sodium methylate and 50 parts of acetonitrile was stirred at 75–80° C. for 30 minutes. The reaction mixture was diluted with 500 parts of cold water and the reaction mixture acidified with acetic acid. The crude m - [p - (3 - cyanoacetyl-5 - methyl - 1 - pyrazolyl) benzamido]benzaldehyde ethylene glycol acetal was collected, washed and crystallized from a methylene chloride-ether mixture. The yield of colorless crystals melting at 161–163° C. was 30 parts. This compound has the formula:

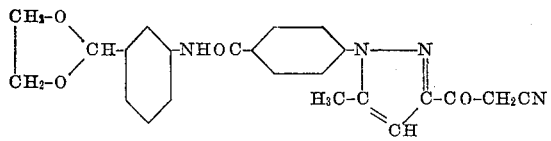

Analysis:
Calcd. for $C_{23}H_{20}O_4N_4$____ C, 66.33; H, 4.84; N, 13.46
Found _____ C, 66.43; H, 5.30; N, 13.39; 13.66

E. m-[p-(3-cyanoacetyl-5-methyl-1-pyrazolyl)-benzamido]-benzaldehyde polyvinyl acetal A mixture of 10 parts of polyvinyl alcohol, 2.4 parts of m - [p - (3 - cyanoacetyl - 5 - methyl-1-pyrazolyl)benzamido]-benzaldehyde ethylene glycol acetal, 0.15 part of o-sulfobanzaldehyde sodium salt, 0.3 part of p-toluenesulfonic acid monohydrate, 65 parts of ethylene glycol and 8 parts of dioxane was stirred at 65° C. for 15 minutes. The color-forming polyvinyl acetal was isolated essentially as described in Example I, section E.

F. Photographic emulsion using m-[p-(3-cyanoacetyl - 5 - methyl - 1 - pyrazolyl) benzamido] benzaldehyde polyvinyl acetal A 5% solution of m-[p-(3-cyanoacetyl-5-methyl - 1 - pyrazolyl) benzamido]benzaldehyde polyvinyl acetal was prepared essentially as described in Example I, section F. A silver halide emulsion was prepared, coagulated, washed, redispersed, coated on film base and a piece of the exposed photographic film was processed as outlined in Example I, section F. A brilliant magenta negative image dye was obtained.

EXAMPLE IX

A. Ethyl 1-(p-carboxyphenyl)-5-phenylpyrazole-3-carboxylate

To a stirred solution of 66 parts of ethyl benzoylpyruvate (see Beyer and Claisen, Ber. 20, 2181 (1887)) in 225 parts of acetic acid was added, in small portions, 46 parts of p-carboxyphenylhydrazine, the temperature being maintained at 10–15° C. by means of external cooling. The reaction mixture was stirred at room temperature for one hour, then heated to reflux and refluxed for 15 minutes. The reaction mixture was poured into 1000 parts of cold water, whereupon an oil separated which soon solidified. Crystallization of the crude ethyl 1-(p-carboxyphenyl) - 5 - phenylpyrazole - 3 - carboxylate from ethanol gave colorless fine needles, M. P. 200–201° C.

Analysis:
Calcd. for $C_{19}H_{16}O_5N_2$____ C, 67.84; H, 4.80; N, 8.34
Found _____ C, 67.96; H, 5.12; N, 8.47

B. Ethyl 1 - (p - chloroformylphenyl) - 5 - phenylpyrazole-3-carboxylate

A suspension of 88 parts of ethyl 1-(p-chloroformylphenyl) - 5 - phenylpyrazole - 3 - carboxylate, 200 parts of benzene and 88 parts of thionyl chloride was refluxed until a homogeneous solution was obtained. After removal of the benzene and excess thionyl chloride under reduced pressure on a steam bath, the ethyl 1-(p-chloroformylphenyl) - 5 - phenylpyrazole - 3-carboxylate was taken up in 125 parts of dioxane and used for the amidation of m-amino-benzaldehyde ethylene glycol acetal without further purification.

C. m - [p - (3 - carbethoxy - 5 - phenyl - 1 - pyrazolyl) benzamido]benzaldehyde ethylene glycol acetal To a mechanically stirred mixture of 41 parts of m-aminobenzaldehyde ethylene glycol acetal, 50 parts of acetone and 75 parts of water was added slowly to the above dioxane solution of ethyl 1 - (p - chloroformylphenyl) - 5 - phenylpyrazole-3-carboxylate, the temperature being kept at 0–5° C. by means of external cooling and the pH at 7–9 by the portionwise addition of a solution of 80 parts of potassium carbonate in 75 parts of water. After stirring for 0.5 hour, the mixture was diluated with water and the crude m - [p - (3 - carbethoxy - 5 - phenyl - 1 - pyrazolyl) benzamido]-benzaldehyde ethylene glycol was taken up in methylene chloride. The methylene chloride solution was washed with water, dried, and concentrated on a steam bath under reduced pressure. The residual oil could not be induced to crystallize.

D. m - [p - (3 - cyanoacetyl - 5 - phenyl - 1 - pyrazolyl) benzamido]benzaldehyde ethylene glycol acetal A mixture of 125 parts of m-[p-(3-carbethoxy - 5 - phenyl - 1 - pyrazolyl) benzamido] benzaldehyde ethylene glycol acetal, 100 parts of acetonitrile and 30 parts of sodium methylate was stirred at 70–80° C. for 1 hour. The reaction mixture was diluted with 1000 parts of cold water and the resulting solution was acidified with acetic acid. The m - [p - (3 - cyanoacetyl - 5-phenyl - 1 - pyrazolyl) benzamido]benzaldehyde ethylene glycol acetal was crystallized from methylene chloride to give fine, colorless crystals, M. P. 196–198° C. This compound has the formula

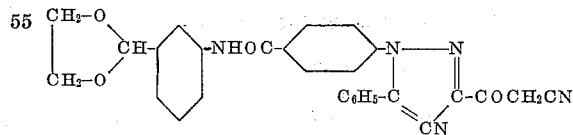

Analysis:
Calcd. for $C_{28}H_{22}O_4N_4$____ C, 70.26; H, 4.64; N, 11.72
Found _____ C, 70.31; H, 4.62; N, 11.78

E. m - [p - (3 - cyanoacetyl - 5 - phenyl - 1 - pyrazolyl) benzamido]benzaldehyde polyvinyl acetal A mixture of 5 parts of polyvinyl alcohol, 0.15 part of o-sulfobenzaldehyde sodium salt, 1.2 parts of m-[p-(3-cyanoacetyl-5-phenyl-1-pyrazolyl)-benzamido]benzaldehyde ethylene glycol acetal, 35 parts of ethylene glycol, 4.5 parts of dioxane and 0.4 part of 92% phosphoric acid was stirred at 70–80° C. for 1.5 hours. The color-forming polyvinyl acetal was isolated essentially as described in Example I, section E.

F. *Photographic emulsion using m-[p-(3-cyanoacetyl-5-phenyl-1-pyrazolyl)benzamido]benzaldehyde polyvinyl acetal*

A 5% solution of m-[p-(3-cyanoacetyl-5-phenyl - 1 - pyrazolyl) benzamido]benzaldehyde polyvinyl acetal was prepared essentially as described in Example I, section F. A silver halide emulsion was prepared, coagulated, washed, redispersed, coated on film base and a piece of the exposed photographic film was processed as outlined in Example I, section F. A beautiful magenta image dye was obtained.

This invention as is apparent from the above is generic to the polyhydric alcohol acetals of the formula:

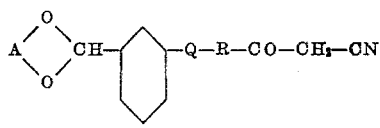

wherein A represents the carbon chain of a monomeric or polymeric polyhydric alcohol, R is a divalent radical, aromatic in character, whose terminal atoms are carbon, and Q is an acylamido group, i. e., a carbonamido or sulfonamido group, the nitrogen atom of said group being attached to the benzene nucleus bearing the acetal group. The carbon atoms in the chain A which are attached to the two oxygen atoms to form an acetal linkage are either adjoining or separated by one carbon atom. In addition to the various compounds shown in the examples, other specific acetals which may be mentioned are those in which the aromatic radical attached to the acylamido group (Q) is:

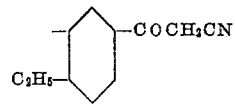

5-cyanoacetyl-2-ethylphenyl

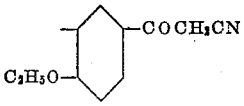

5-cyanoacetyl-2-ethoxyphenyl

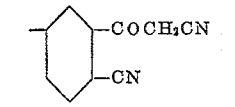

5-cyanoacetyl-4-cyanophenyl

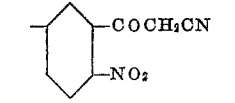

5-cyanoacetyl-4-nitrophenyl

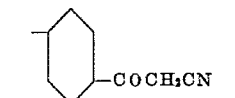

4-cyanoacetyl-3-hydroxyphenyl

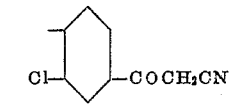

4-cyanoacetyl-2-chlorophenyl

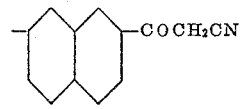

2-cyanoacetyl-7-naphthyl

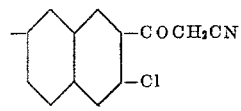

2-cyanoacetyl-3-chloro-7-naphthyl

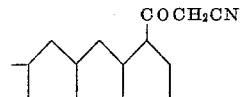

1-cyanoacetyl-7-anthryl

2-cyanoacetyl-8-phenanthryl

2-cyanoacetyl-5-benzopyridyl

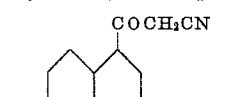

1-cyanoacetyl-4-naphthyl

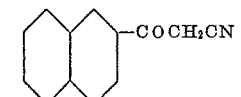

2-cyanoacetyl-4-naphthyl

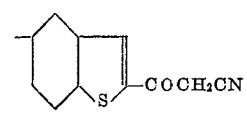

3-cyanoacetyl-5-thionaphthyl

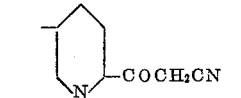

2-cyanoacetyl-5-pyridyl

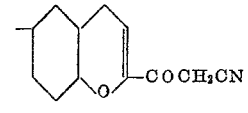

2-cyanoacetyl-6-benzopyryl

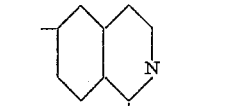

1-cyanoacetyl-6-isoquinolyl

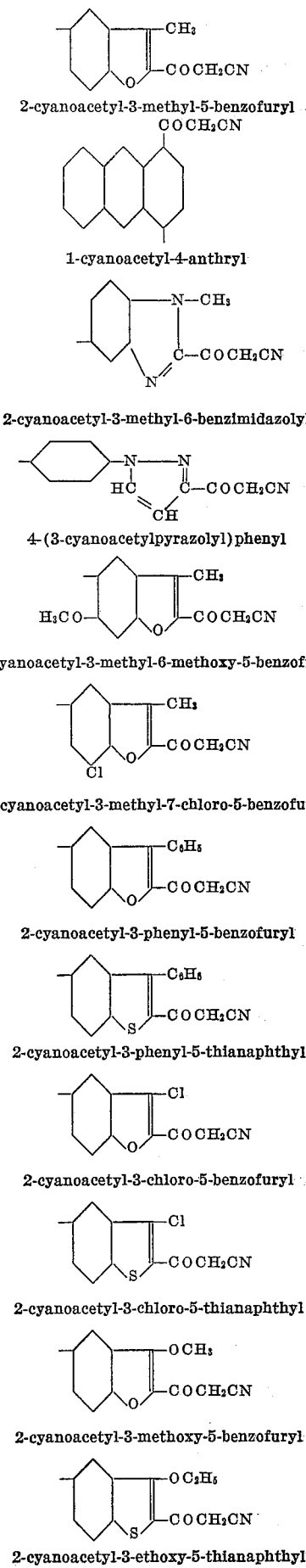

2-cyanoacetyl-3-methyl-5-benzofuryl 1-cyanoacetyl-4-anthryl 2-cyanoacetyl-3-methyl-6-benzimidazolyl 4-(3-cyanoacetylpyrazolyl)phenyl 2-cyanoacetyl-3-methyl-6-methoxy-5-benzofuryl 2-cyanoacetyl-3-methyl-7-chloro-5-benzofuryl 2-cyanoacetyl-3-phenyl-5-benzofuryl 2-cyanoacetyl-3-phenyl-5-thianaphthyl 2-cyanoacetyl-3-chloro-5-benzofuryl 2-cyanoacetyl-3-chloro-5-thianaphthyl 2-cyanoacetyl-3-methoxy-5-benzofuryl 2-cyanoacetyl-3-ethoxy-5-thianaphthyl

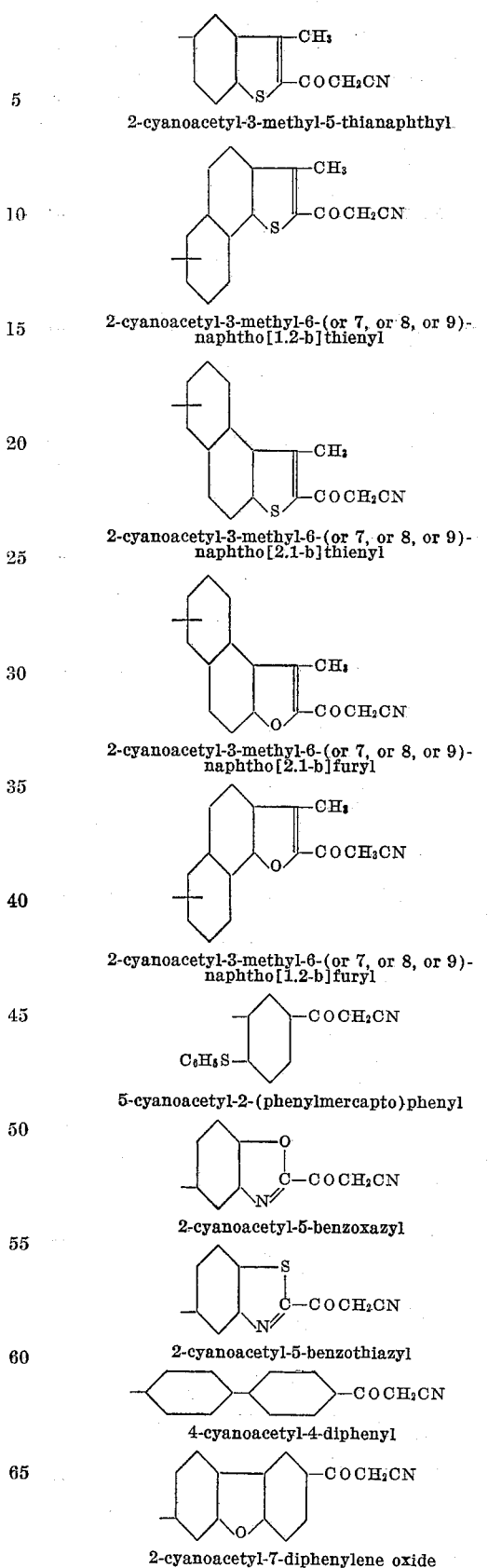

2-cyanoacetyl-3-methyl-5-thianaphthyl 2-cyanoacetyl-3-methyl-6-(or 7, or 8, or 9)-naphtho[1.2-b]thienyl 2-cyanoacetyl-3-methyl-6-(or 7, or 8, or 9)-naphtho[2.1-b]thienyl 2-cyanoacetyl-3-methyl-6-(or 7, or 8, or 9)-naphtho[2.1-b]furyl 2-cyanoacetyl-3-methyl-6-(or 7, or 8, or 9)-naphtho[1.2-b]furyl 5-cyanoacetyl-2-(phenylmercapto)phenyl 2-cyanoacetyl-5-benzoxazyl 2-cyanoacetyl-5-benzothiazyl 4-cyanoacetyl-4-diphenyl 2-cyanoacetyl-7-diphenylene oxide and the like. The nature of the radical R and of its substituents, if any, is largely immaterial provided the radical R is aromatic in character and has a cyanoacetyl group attached thereto, since the latter together with the acylamido group are the important parts of the molecule.

In general, the most useful compounds of this invention are those in which the radical R is (a) a nuclear structure, aromatic in character, containing a six-membered aromatic hydrocarbon nucleus, e. g., phenylene, alkyl- or aryl-substituted phenylene, naphthylene, anthrylene, or phenylene substituted by halogen, ether, thioether or carbalkoxy groups; or, (b) a heterocyclic nuclear structure, aromatic in character, containing at least one oxygen, sulfur or nitrogen atom in the ring configuration, the remainder of the nuclear structure being carbon and hydrogen. Especially desirable are color-formers which contain a heterocyclic nucleus with the cyanoacetyl group attached to a carbon atom which is in turn attached to at least one oxygen, sulfur or nitrogen atom in the ring configuration. These color-formers have been found to give the most nearly ideal magenta dyes for the three-color subtractive process. Outstanding results are obtained with the compounds in which the radical R contains a benzofuran or a thianaphthene nucleus. Moreover, in the case of the benzofuran nucleus, the substitution of the 3-hydrogen atom by radicals such as alkyl, aryl or halogen gives color-forming acetals of improved stability.

The alcohol portion of the acetal molecule may be any desired polyhydric alcohol. When it is monomeric, it is preferably a dihydric or trihydric aliphatic alcohol of two to four carbon atoms, e. g., ethylene glycol, glycerol, 1,2- and 1,3-propylene glycol or 1,2- and 1,3-butylene glycol and still more preferably an alkanediol of 2 to 4 carbon atoms. When it is polymeric, it may be any completely or partially hydrolyzed polymer of a vinyl carboxylate, particularly a vinyl ester of a monocarboxylic acid of one to four carbons, e. g., vinyl formate, vinyl acetate, vinyl chloracetate, vinyl propionate, vinyl butyrate, etc. The vinyl carboxylate should be sufficiently hydrolyzed so that the groups —CH$_2$—CHOH— represent at least 50% of the polymer chain, i. e., for every 100 chain atoms there are at least 25 hydroxyl groups. Hydrolyzed interpolymers of vinyl esters with minor proportions (10% or less by weight) of other polymerizable vinyl compounds, e. g., vinyl chloride, methyl methacrylate, etc., may be used, especially when a lower degree of water solubility is desired. In particular, the water-soluble or hydrophilic hydrolyzed olefin/vinyl ester interpolymers and especially the hydrolyzed ethylene/vinyl acetate interpolymers described in U. S. Patents 2,386,347 and 2,397,866 are useful. The preferred polyhydric alcohol is polyvinyl alcohol, e. g., substantially completely hydrolyzed polyvinyl acetate, and in particular the polyvinyl alcohols ranging in viscosity from 5 to 50 centipoises in 4% aqueous solution at 20° C.

In the polyvinyl acetals of this invention it is preferred that between 0.75% and 10%, and preferably between 1% and 7.5% of the hydroxyl groups of the polyvinyl alcohol be acetalized with the cyanoacetyl acylamido benzaldehyde. Below 0.75% acetalization, there are insufficient color-forming groups present to give sufficient color strength in a photographic color film. When more than 10% of the hydroxyl groups of the polyvinyl alcohol are acetalized, the permeability of the layer to the various solutions used to process the photographic film becomes too low for practical application. The polyvinyl acetals falling within the above-defined range are outstanding with respect to top color density, light stability and spectral characteristics in the magenta range on color development with p-amino-diethylaniline type developers. These polymeric compounds are amorphous, high-molecular weight solids which are insoluble in dilute aqueous sodium hydroxide and hot water but are soluble in 10–40% aqueous ethanol.

As illustrated in some of the examples, an advantageous modification of the invention is obtained when acidic salt-forming groups are introduced into the polymeric acetal by reaction of the polyvinyl alcohol or partial polyvinyl acetal with aldehydes containing carboxylic or sulfonic acid groups. In addition to the o-sulfobenzaldehyde of the examples, which is the preferred aldehydoacid, suitable compounds include phthalaldehydic acid, glyoxalic acid and propionaldehyde beta-sulfonic acid. Desirably, from 0.1% to 5% of the hydroxyl groups in the polyvinyl alcohol are acetalized with such an aldehydoacid.

The invention is not limited to the cyanoacetylacylamido-benzaldehyde acetals described above but also includes as new chemical compounds the cyanoacetyl aryl carboxylic acid chlorides of the formula ClOC—R—COCH$_2$CN; the carboalkoxy aryl sulfonyl chlorides of the formula ClO$_2$S—R—COOR′, where R′ is the nonhydroxyl portion of a monohydric aliphatic alcohol, preferably an alkanol of 1 to 4 carbon atoms; and the monomeric polyhydric alcohol acetals of carbalkoxy acylamido benzaldehyde, i. e., the acetals with a monomeric polyhydric alcohol (preferably a dihydric or trihydric aliphatic alcohol of 2 to 4 carbon atoms as described above) of aldehydes of the formula

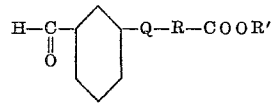

where R′ is as above and Q is the carbonamido or sulfonamido group, the nitrogen atom of said group being attached to the benzene nucleus bearing the acetal group. In all of the above formulae the radical R has the significance already mentioned, i. e., it represents a divalent radical, aromatic in character, whose terminal atoms are carbon. The above products are useful as intermediates in the preparation of color-forming cyanoacetyl acylamido benzaldehyde acetals, and as intermediates in other chemical syntheses.

The cyanoacetylacylamido benzaldehyde acetals of this invention may be added to gelatin or other colloid silver halide emulsions as color-formers. The polyvinyl acetals find use as the sole binders for light-sensitive silver halides for photographic color films. The polyvinyl acetal color-formers can be mixed with additional colloids, e. g., the hydroxyl polymers described above as reactants in the acetalization reactions, e. g., polyvinyl alcohol and the mixtures used as the binding agents for silver halide grains. Emulsions made from the novel polymeric acetals of this invention are resistant to bacterial putrefaction and mold and can be stored for longer periods of time under adverse conditions than the conventional gelatin emulsions. The emulsions of this invention may contain the conventional ingredients, e. g., sensitizing dyes, fog-inhibitors, general emulsion sensitizers, etc.

As many widely different embodiments of this invention can be made without departing from the spirit and scope thereof, it is to be understood that the invention is not to be limited except as defined by the claims.

What is claimed is:
1. Monomeric acetals of the formula:

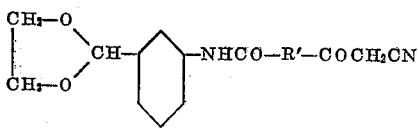

wherein R' is a hydrocarbon radical having a divalent aromatic nucleus the two —CO— groups being attached to cyclic carbons in such nucleus.

2. Monomeric acetals of the formula:

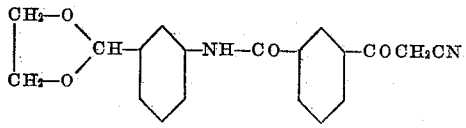

3. Polymeric acetals containing a large number of recurring intralinear

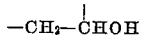

groups and groups of the formula:

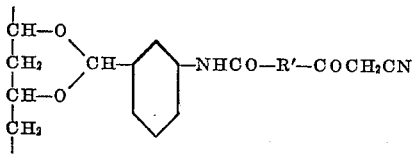

wherein R' is a hydrocarbon radical having a divalent aromatic nucleus the two —CO— groups being attached to cyclic carbons in such nucleus.

4. Polymeric acetals containing a large number of recurring intralinear

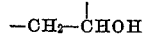

groups and groups of the formula:

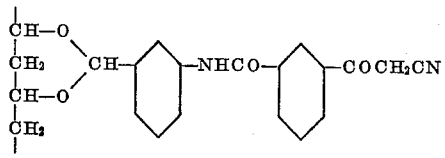

5. Acetals of the formula:

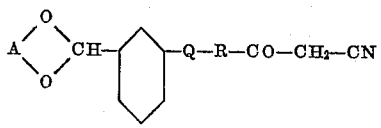

wherein A is the residue of an aliphatic polyhydric alcohol, the carbon atoms of the carbon chain of said alcohol that are attached to the oxygen atoms which are attached to the >CH— group being not more than one carbon atom apart in said chain, Q is an amido radical selected from the group consisting of —NHCO— and —NHSO₂— radicals, the nitrogen atom of said radical being attached to the benzene nucleus bearing the acetal group and R is a divalent cyclic radical having a ring selected from the group consisting of (a) an aromatic carbocyclic ring, (b) an aromatic carbocyclic ring fused to a ring selected from the group consisting of furane, thiofurane and azole rings, (c) a pyrazolylphenyl ring, (d) a pyridine ring, and (e) a benzopyridine ring, the free valences of the ring that are attached to —Q— and —CO— being on carbon atoms in the ring, said radicals —Q— and —CO— being joined solely through atoms in said ring, the radical shown in the formula being the sole radical present containing a cyanoacetyl group.

6. Polymeric acetals containing a large number of recurring intralinear

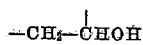

groups and groups of the formula:

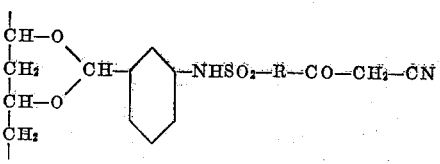

wherein R is a divalent cyclic radical having a ring selected from the group consisting of (a) an aromatic carbocyclic ring, (b) an aromatic carbocyclic ring fused to a ring selected from the group consisting of furane, thiofurane and azole rings, (c) a pyrazolylphenyl ring, (d) a pyridine ring, and (e) a benzopyridine ring, the free valences of the ring that are attached to —NHSO₂— and —CO— being on carbon atoms in the ring, said radicals —NHSO₂— and —CO— being joined solely through atoms in said ring, the radical shown in the formula being the sole radical present containing a cyanoacetyl group.

7. A mixed m-(2-cyanoacetyl-5-benzofurane sulfamido)-benzaldehyde acetal-sodium o-sulfobenzaldehyde acetal of polyvinyl alcohol containing intralinear

 groups

8. A mixed m-[p-(3-cyanoacetyl-5-methyl-1-pyrazolyl)-benzamido]benzaldehyde acetal, sodium o-sulfobenzaldehyde acetal of polyvinyl alcohol containing intralinear

 groups

9. A mixed m-[p-(3-cyanoacetyl-5-phenyl-1-pyrazolyl)-benzamido]benzaldehyde acetal, sodium o-sulfobenzaldehyde acetal of polyvinyl alcohol containing intralinear

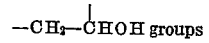 groups

10. Monomeric acetals of the formula:

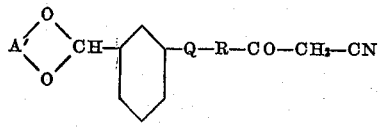

wherein A' is the non-hydroxyl radical of an alkanediol the carbon atoms of which attached to the oxygen atoms are not more than one carbon atom apart in said radical, Q is an amido radical selected from the group consisting of —NHCO— and —NHSO₂— radicals, the nitrogen atom of said radical being attached to the benzene nucleus bearing the acetal group, and R is a divalent cyclic radical having a ring selected from the group consisting of (a) an aromatic carbocyclic ring, (b) an aromatic carbocyclic ring fused to a ring selected from the group consisting of furane, thiofurane and azole rings, (c) a pyrazolylphenyl ring, (d) a pyridine ring, and (e) a benzopyridine ring, the free valences of the ring that are attached to —Q— and —CO— being on carbon atoms in the ring, said radicals —Q— and —CO— being joined solely through atoms in said ring.

11. Polymeric acetals containing a large number of recurring intralinear

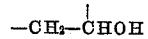

groups and groups of the formula:

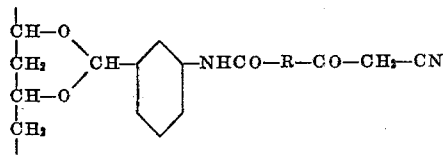

wherein R is a divalent cyclic radical having a ring selected from the group consisting of (a) an aromatic carbocyclic ring, (b) an aromatic carbocyclic ring fused to a ring selected from the group consisting of furane, thiofurane and azole rings, (c) a pyrazolylphenyl ring, (d) a pyridine ring, and (e) a benzopyridine ring, the free valences of the ring that are attached to —NHCO— and —CO— being on carbon atoms in the ring, said radicals —NHCO— and —CO— being joined solely through atoms in said ring, the radical shown in the formula being the sole radical present containing a cyanoacetyl group.

References Cited in the file of this patent

UNITED STATES PATENTS

| Number | Name | Date |
|---|---|---|
| 2,208,808 | Fischer | July 23, 1940 |
| 2,272,153 | Moyle | Feb. 3, 1942 |
| 2,320,422 | Frohlich | June 1, 1943 |
| 2,350,127 | Porter et al. | May 30, 1944 |
| 2,356,480 | Swan | Aug. 22, 1944 |
| 2,380,032 | Dorough et al. | July 10, 1945 |
| 2,418,297 | French et al. | Apr. 1, 1947 |
| 2,439,969 | Forneau | Apr. 20, 1948 |
| 2,445,733 | Radcliff | July 20, 1948 |
| 2,476,264 | Niederhauser | July 12, 1949 |
| 2,489,655 | Martin | Nov. 29, 1949 |
| 2,507,180 | Salminen | May 9, 1950 |
| 2,527,880 | Harris | Oct. 31, 1950 |
| 2,538,257 | Martin | Jan. 16, 1951 |
| 2,574,506 | Sletzinger et al. | Nov. 13, 1951 |